No. 704,488. Patented July 8, 1902.
P. T. SIEVERT.
APPARATUS FOR THE MANUFACTURE OF MOLDED HOLLOW GLASS ARTICLES.
(Application filed Jan. 28, 1902.)
(No Model.)
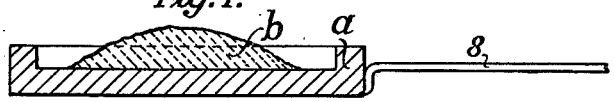
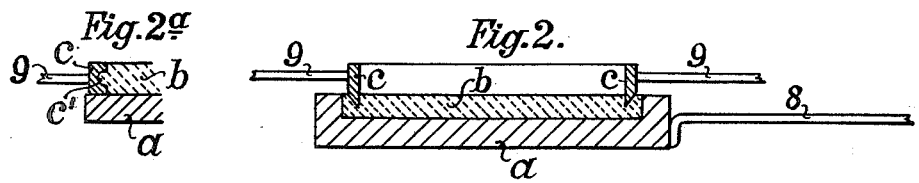
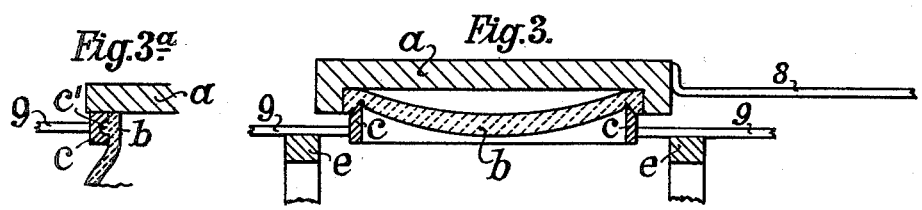
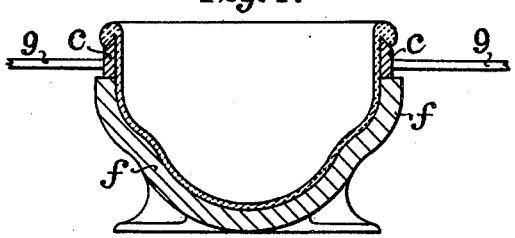
Witnesses:
Henry Thieme.
George Barry Jr.
Inventor:
Paul Theodor Sievert
by attorneys
Brown & Seward

UNITED STATES PATENT OFFICE.

PAUL THEODOR SIEVERT, OF DRESDEN, GERMANY.

APPARATUS FOR THE MANUFACTURE OF MOLDED HOLLOW GLASS ARTICLES.

SPECIFICATION forming part of Letters Patent No. 704,488, dated July 8, 1902.

Application filed January 28, 1902. Serial No. 91,544. (No model.)

*To all whom it may concern:*

Be it known that I, PAUL THEODOR SIEVERT, a subject of the King of Saxony, and a resident of Dresden, in the Kingdom of Saxony, German Empire, have invented a new and useful Improvement in Apparatus for the Manufacture of Molded Hollow Glass Articles, of which the following is a specification.

This invention relates to apparatus for the manufacture of molded hollow glass articles by the process which forms part of the subject-matter of my application, Serial No. 63,713, filed June 8, 1901, for United States Patent. According to that process liquid glass is first spread out in a sheet-like layer, which, while remaining plastic by the retention of a portion of the heat of fusion, is held to the margin of an open mold and allowed to mold itself therein by its own weight.

I will first fully describe the said apparatus with reference to the accompanying drawings, and afterward point out its novelty in claims.

Figures 1, 2, 2ª, 3, 3ª, and 4 are vertical sectional views of the several parts of the apparatus, illustrating their use in different stages of the process to be performed.

The essential parts of the apparatus consist of a slab $a$, in which the molten glass is first spread in a sheet-like layer, a simple undivided ring or frame $c$, onto which the said layer is taken from said slab, and an open mold $f$, into which the portion of said layer included within said frame or ring $c$ is allowed to mold itself by its own weight. This mold has its interior of a form the counterpart of the exterior of the hollow article to be produced. The slab $a$ is represented as provided with a handle 8, and the ring or frame is represented as provided with two opposite handles 9. In Figs. 2 and 3 the ring or frame $c$ is represented as having a sharp edge.

The operation of this apparatus is as follows: A mass of liquid glass $b$ having been deposited, as shown in Fig. 1, upon the slab $a$ and having been spread out thereon in a sheet-like layer, as shown in Fig. 2, the frame or ring $c$ is placed with its sharp edge downward upon the said layer and the said edge is pressed into the glass. The slab, the frame or ring, and the layer of glass are then inverted together, and the handles 9 of the frame are placed on any suitable supports $e\ e$, as shown in Fig. 3, wherein it is shown that the glass, which is in a plastic condition, begins to sag within the frame or ring $c$. The frame or ring is then placed upon the margin of the open mold $f$, as shown in Fig. 4, and has the slab removed from it. The glass remaining plastic by the retention of a portion of the heat of fusion goes on sagging or sinks by its own weight through the frame and within the mold until by coming to rest against the interior of the latter it receives the desired shape.

Figs. 2ª and 3ª illustrate a modification of the frame $c$, which is made with an internal groove $c'$ running all around it for the purpose of holding the edges of the spread layer $b$ of glass. For the use of this holding-frame $c$ the plate $a$ is made without the surrounding upwardly-projecting rim shown upon it in Figs. 1, 2, and 3, and in such use the said frame is placed upon the plate $a$ before the pouring of the molten glass upon the latter, and then the molten glass is poured within the said frame.

What I claim as my invention is—

1. In an apparatus for the manufacture of molded hollow glass articles, the combination of an open mold and an undivided frame for holding a layer of plastic glass independently of the mold itself and supporting the so-held layer on the margin of the mold while a portion of said layer within said frame sinks through said frame into the mold and molds itself therein by its own weight, substantially as herein described.

2. In an apparatus for the manufacture of molded hollow glass articles, the combination with an open mold, of an undivided and invertible frame for receiving and turning over a layer of plastic glass and supporting the so received and turned-over layer on a margin of the mold while a portion of said layer within said frame sinks through said frame into the mold and molds itself therein by its own weight, substantially as herein described.

In testimony that I claim the foregoing as my invention I have signed my name, in presence of two witnesses, this 10th day of January, 1902.

PAUL THEODOR SIEVERT.

Witnesses:
 HERNANDO DE SOTO,
 EMIL WOEDE.